United States Patent [19]

Robertson et al.

[11] Patent Number: 4,952,431

[45] Date of Patent: Aug. 28, 1990

[54] FIBROUS SUBSTRATES FOR SAUSAGE CASING AND METHOD FOR PRODUCING SAME

[75] Inventors: Diane M. Robertson, West Suffield; Ronald H. Pomeroy, Windsor Locks; Alan W. Meierhoefer, West Hartford, all of Conn.

[73] Assignee: The Dexter Corporation, Windsor Locks, Conn.

[21] Appl. No.: 336,779

[22] Filed: Apr. 13, 1989

[51] Int. Cl.$^5$ .............................................. A22C 13/00
[52] U.S. Cl. .................................. 428/34.8; 106/165; 138/118.1; 156/181; 264/187; 428/288; 428/289; 428/534
[58] Field of Search .................... 138/118.1; 426/105, 426/135; 428/34.8, 288, 289, 534; 156/181; 264/187; 106/165

[56] References Cited

U.S. PATENT DOCUMENTS

| | | | |
|---|---|---|---|
| 3,468,696 | 9/1964 | Conway | 428/479.6 |
| 3,484,256 | 12/1969 | Chiu et al. | 428/503 |
| 3,884,270 | 5/1975 | Rasmussen | 138/118.1 |
| 4,221,821 | 9/1980 | Hammer et al. | 138/118.1 |
| 4,563,376 | 1/1986 | Hammer et al. | 428/34.8 |
| 4,590,107 | 5/1986 | Bridgeford | 138/118.1 |
| 4,762,564 | 8/1988 | Bridgeford | 428/290 |
| 4,789,006 | 12/1988 | Bridgeford | 138/118.1 |

Primary Examiner—James Seidleck
Attorney, Agent, or Firm—Chilton, Alix & Van Kirk

[57] ABSTRACT

A new bonding agent for fibrous substrates used to reinforce food casing is formulated by dissolving cellulose carbamate and an alkaline curing resin in a dilute caustic solution in such a manner that the ratio of carbamate to resin is greater than 1:1 by weight. The preferred resin is a polymeric reaction product of epichlorohydrin and a polyamide. The bonded substrate contains up to 10% by weight of the bonding agent and exhibits a porosity that is not significantly less than that of the base web and a caustic tensile strength greater than 300 grams per 25 millimeters. Casings made from the substrate can use the casing films employed heretofore or a carbamate-resin film formulation.

22 Claims, 1 Drawing Sheet

FIBROUS SUBSTRATES FOR SAUSAGE CASING AND METHOD FOR PRODUCING SAME

BACKGROUND AND SUMMARY OF THE INVENTION

The present invention relates generally to casing used for packaging food products such as sausage and the like. More particularly it is concerned with a new and improved casing substrate and reinforced casing made therefrom, as well as with a new and improved method of producing such substrates and casings.

Heretofore it has been the practice to make reinforced films, tubing, casings or skins for food products and the like by sequential and repeated treatment of fibrous base papers or webs with a cellulose coating material, such as cellulose xanthate, hereinafter referred to as viscose. That treatment includes the preparation of a bonded casing substrate having substantial caustic stability followed by the final casing-forming operations. The caustic stable substrate is prepared by bonding a preformed and dried paper or fibrous base web with a dilute viscose solution followed by the steps of drying, regenerating the cellulose, washing and redrying. This initial bonding operation using the dilute viscose solution is required in order to impart sufficient caustic resistance to the bonded substrate to retain its structural integrity during the final casing-forming operations where treatment with a more concentrated viscose solution is carried out under highly alkaline conditions. The bonded substrate must also retain its porous, absorbent characteristics in order to permit complete impregnation and encasement by the concentrated viscose solution. The bonded substrate then undergoes the casing-forming operation that includes the steps of forming the substrate into a cylindrical tube, impregnating and encasing the substrate tube with a highly caustic viscose solution, regenerating the impregnate with acid, washing to remove excess acid and viscose and drying of the final fiber reinforced leakproof cellulosic film, hereinafter referred to as the casing or skin. This process is set forth in greater detail in the Underwood U.S. Pat. No. 3,135,613 entitled "Impregnated Paper Webs and Method of Making Sausage Casing Thereof", thus clarifying the sequential evolution of the base web to the bonded substrate and then to the reinforced casing.

The tubular casings produced in the manner set forth possess enough strength and burst resistance to be particularly well suited for enclosing meat and other food products such as fish or vegetables that are injected into the interior of the tubes under pressure. They thereby provide firm uniform enclosures for well known products such as sausage, bologna and the like as well as other food products. Modern processing equipment makes such products automatically but requires casing material that withstands high stuffing pressures without bursting and can be filled to a known and uniform diameter. The product may be automatically sliced and wrapped and must meet a stated meat content since any increase in the diameter of the casing over the required minimum necessarily results in a loss to the meat packer. Although casing substrates made according to the prior art have yielded casing of satisfactory strength and uniformity for the equipment utilized heretofore, modern machinery has required casings of improved strength characteristics.

Various patents subsequent to the aforementioned U.S. Nos. 3,135,613 have discussed the use of alternative materials for bonding the paper webs to provide appropriate casing substrates. In selecting bonding materials other than the commercially employed acid-regenerated viscose, it is important that the bonding materials meet both the processing and performance requirements of the food casings produced therefrom. In particular, the fibrous base web to which the bonding agent is to be applied must exhibit sufficient strength to withstand the stresses exerted during the coating operation. The amount of bonding agent cannot interfere with subsequent viscose penetration during the casing manufacturing process so that there is a loss of strength in the casing, or that there is a detrimental effect on the appearance of the casing. Also, the bonding agent should be one which will not cause the substrate to become discolored during exposure to the conditions of the casing forming process. In U.S. Pat. No. 3,484,256 to Chiu et al, it is suggested that the dilute viscose bonding treatment be replaced by the use of a bonding agent or mixture of a cationic thermosetting resin and a polyacrylamid resin. A bonding mixture of a cationic alkaline curing resin and carboxymethyl cellulose is disclosed in U.S. Pat. No. 3,468,696 to Conway as a substitute wet strength bonding treatment. The U.S. Pat. Nos. 3,640,734 and 3,640,735 to Oppenheimer et al teach the formation of substrates using insolublized poly (vinyl alcohol) or poly (vinyl alcohol)/poly (vinyl ester) copolymers such as poly (vinyl alcohol)/poly (vinyl acetate).

More recently U.S. Pat. Nos. 4,762,564 and 4,789,006 to Bridgeford et al have indicated that viscose casing films can be replaced by cellulose aminomethanate (hereinafter referred to as cellulose carbamate) films, thereby eliminating the toxic and noxious sulfur containing chemical species associated with viscose manufacture and use. However, U.S. Nos. 4,762,564 states that carbamate films have a lower tensile strength than viscose films. Since reinforced casings made from carbamate only exhibit strength characteristics essentially comparable to casings made from reinforced viscose, only the manufacturing advantages that avoid toxic materials have been emphasized. Unfortunately, Bridgeport apparently found that the substitution of carbamate films for viscose films lacked improved results regardless of the substrate employed. Recognizing this, U.S. Pat. Nos. 4,777,249 and the aforementioned U.S. 4,789,006 reported that cross linking of the carbamate casing with highly acidic solutions of glutaraldehyde or melamine formaldehyde was needed to improve the strength of the carbamate film. It has also been found, as reported herein, that for casing using a carbamate bonded fibrous substrate, the casing strength is significantly lower for carbamate casing than for viscose casing. Cross linking of the reinforced films at high concentrations of cross linking agents have not been effective to improve the properties of those films.

It has now been advantageously found that significant improvements can be achieved even with carbamate casings by improving the strength characteristics of the substrates used to reinforce the casing. This improvement can be obtained while retaining the non toxic advantages of carbamate film use relative to the manufacture and use of viscose.

Other advantages will be in part obvious and in part pointed out more in details hereinafter.

These and related advantages are obtained by providing a porous bonded fibrous substrate comprising a fibrous base web containing about 10% by weight or less of a particular bonding agent. The bonding agent is formulated by dissolving cellulose carbamate and an alkaline curing resin in a dilute caustic solution in such a manner that the ratio of carbamate to resin is greater than 1:1 by weight. The bonded substrate exhibits a porosity that is not significantly less than that of the base web, i.e., a porosity of at least about 300 liters/min as determined by TAPPI test method T251-pm-75, a caustic tensile strength greater than 300 grams per 25 millimeters and is readily adapted to form reinforced casing films of improved burst strength. Casings made from the substrate can use the casing films employed heretofore or a carbamate-resin film formulation of the present invention.

The invention accordingly comprises the several steps and the relation of one or more of such steps with respect to each of the others and the article possessing the features, properties and relation of elements exemplified in the following detailed disclosure.

DESCRIPTION OF PREFERRED EMBODIMENT

Figure 1:
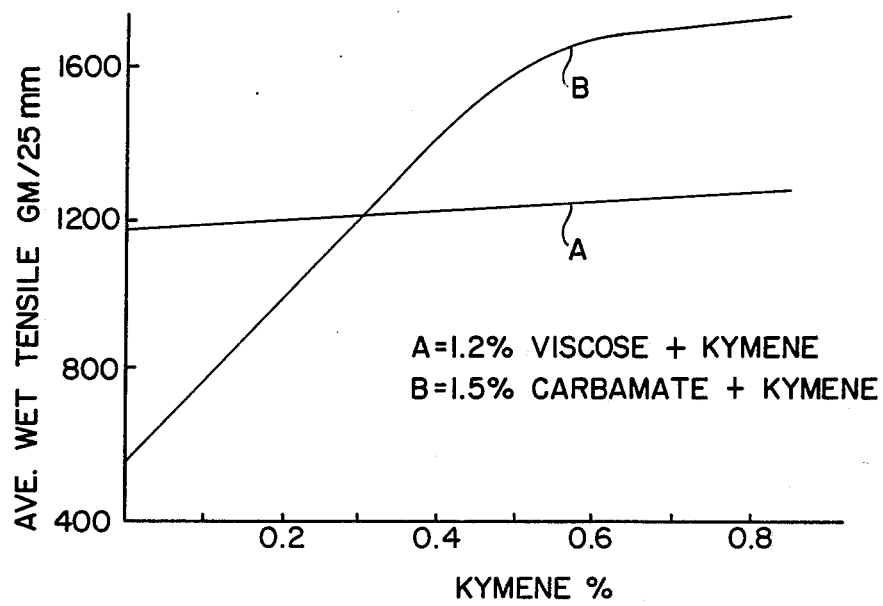
FIGS. 1 and 2 are graphs illustrating the effect on the wet and caustic tensile strength of bonded substrates where the resin concentration is varied in either a carbamate or viscose bonding solution.

It has now been found according to the present invention that the foregoing and related advantages can be achieved by bonding the fibrous base web with a bonding agent consisting of a combination of carbamate and a neutral to alkaline curing resin. This combination imparts to the base web substantial resistance to degradation in the highly caustic casing-forming solutions, yet permits the rapid penetration of that solution into the bonded substrate structure. Additionally, the associated casing manufacturing operations are accomplished in a facile and more effective manner without necessitating substantial alterations in the equipment or techniques employed. It is likewise significant that reinforced casing films having improved burst strengths are hereby obtained from film forming materials of significantly lower tensile strength.

Briefly, the process comprises the steps of forming a dilute suspension of cellulosic fibers, such as manila hemp fibers, and thereafter forming a base web from the suspension. The base web is then bonded using a solution of cellulose carbamate and certain neutral to alkaline curing resin materials, such as the polymeric reaction product of epichlorohydrin and a polyamide. In this connection it should be noted that frequently the base web materials themselves are made using the same, or a similar, alkaline curing resin as a beater added material, as more fully described in the aforementioned U.S. Pat. No. 3,468,696; however, the bonding treatment of the present invention exhibits improved results over viscose bonded substrates using such base webs.

The base web for the casing substrate is generally composed of natural fibers of pure cellulose and preferably comprises the long, light weight and nonhydrated fibers of the *Musa textilis* species, typical of which are hemp fibers. Webs made from this material are generally soft, porous papers of uniform texture and thickness and possess a tensile ratio close to unity, that is, a substantially equal tensile strength in both the machine and transverse directions. However, it will be appreciated that the tensile ratio may vary from about 0.5 to about 1.0, where such is desired.

It is imperative that the bonding agent utilized, namely the combination of resin and carbamate, not only imparts to the web a resistance to highly caustic solutions, but also provides no significant interference with the absorption characteristics of the base web. Preferably the bonding agent should improve the secure adhesion of the casing forming coating to the reinforced substrate since it is believed that the secure bonding therebetween results in substantial improvement in the burst strength of the resulting casing material. While the mechanism of the present invention is not fully understood it is believed there is a possibility the resin in the bonding agent acts as a bridge between the carbamate and the fibers in the base web. At the same time it should be borne in mind that the web should be devoid, at least as far as possible, of impregnates which might interfere with both the absorption and bonding mechanism. It is therefore necessary that the bonding agent utilized effectuate as little resistance as possible to the penetration of the casing forming coating into the substrate material.

As mentioned, the bonding agent is a combination or mixture of cellulose carbamate and an alkaline curing resin, that is, a resin curable by neutral or base activation. The carbamate can be manufactured in accordance with known procedures such as by the reaction of cellulose with urea at elevated temperatures in accordance with the technique disclosed in U.S. Pat. No. 2,134,825 to Hill et al and U.S Pat. No. 4,404,369 to Huttunen et al and the characteristics of the resultant carbamate material are substantially as disclosed therein. Accordingly, the disclosures contained within those patents are incorporated herein by reference. The carbamate is stable in its dry state and can be stored or transported. It can be readily dissolved in a suitable caustic solution, such as a sodium hydroxide solution, to provide a carbamate concentration up to 15% by weight, but typically is employed in the bonding solution at a concentration of about 0.5–5% by weight and preferably at about 1–3% by weight.

The alkaline curing resins have proved satisfactory from the standpoint of caustic resistance and have resulted in burst ratios for the casings that are comparable to or exceed those obtained by the previously employed dilute viscose bonding treatment. However the preferred resinous materials are the uncured thermosetting resins that are neutral or base activated and particularly the polymeric reaction products of epichlorohydrin and polyamides containing secondary amine groups. Preferably the epichlorohydrin is used in amounts sufficient to convert the secondary amine groups therein to tertiary amines. Generally polyamids from polyalkylene polyamines and saturated or unsaturated aliphatic or aromatic polycarboxylic acids containing from about three to ten carbon atoms are preferred. A typical example of such a material is the water soluble thermosetting cationic epichlorohydrin-polyamid reaction product sold by Hercules Incorporated of Willmington, Delaware under the trade names "Kymene-557H", "Kymene 2064" "Kymene D45" and the like. Other commercially available alkaline curing resins include styrene-maleic anhydride copolymers sold by Monsanto Plastics and Resins Company under the trademark "Scripset", and a polyamide-type resin sold by Borden Chemical Division of Borden, Inc. under the trademark "Cascamid C-12".

The amount of alkaline curing resin used in the bonding solution will vary depending on the desired properties. However, it has been found that good results are obtained when the ratio of resin to carbamate is less than 1:1 and preferably within the range of about 1:10 to about 4:5. Typically, the preferred amount by weight of resin relative to the carbamate falls between the range of 1:5 to 1:2. For example, the preferred resin to carbamate ratio within the bonding solution is about 1 to 3.

Generally, it is advantageous to add to the binder solution very small amounts of a surfactant as an absorption aid. In this connection materials such as the nonionic alkylaryl polyether alcohols may be used. For example, the octylphenoxy polyethoxy ethanol sold by Rohm and Hass under the trademark "Triton Xll4" has been effectively used. Other surfactants include nonylphenoxy poly(ethyleneoxy) ethanols, block copolymers of ethylene oxide and propylene oxide, trimethylnonyl polyethylene glycol ethers, ethoxylated alkyl phenols and alcohols and alkylaryl polyether alcohols. The surfactants are used in the caustic binder solution at concentrations below 2.0% by weight and in fact at concentrations of less that 0.5% by weight and preferably less than 0.1% by weight so as to avoid loss of wet strength in the bonded substrate. Typically concentrations of about 0.01 to 0.05% by weight are used. Below this level the water climb characteristics of the substrate are adversely affected.

To prepare the bonding solution the carbamate is dissolved in an alkali solution, such as an 8% solution of sodium hydroxide at a high concentration, e.g. about 6% by weight carbamate. The solution is then diluted, followed by the addition of the alkaline curing resin and surfactant. The mixture desirably takes the form of a dilute aqueous solution having an alkaline concentration of about 1 to 8% by weight. Typically the concentrations of the components are adjusted to obtain the desired formulation. The pH of the solution is generally in the high alkali range, namely above about 10.0 with the operating pH being approximately 12 to 13.

The preformed fibrous webs, after partial or complete drying, are treated with the dilute alkaline bonding solution in accordance with conventional treatment techniques. Excellent results have been obtained utilizing an immersion or dip coating process to obtain the desired impregnation of the web with the bonding solution. The treated web is then dried and, in accordance with the present invention, is subjected to subsequent acidification, washing and drying steps that impart to the sheet material the desired improved wet strength characteristics while lowering the paper pH to approximately 7.0 and less.

The coated and dried substrate evidences a binder pickup of about 10% by weight or less, with the amount of binder typically falling within the range of 0.5 to 6% by weight. Best results are achieved when the binder pickup is about 2.0 to 4.5% by weight. As mentioned, the bonded substrate not only exhibits improved wet tensile and caustic tensile strength, e.g. caustic tensile strength greater than 300 grams, but also retains a high degree of its porous, absorbent character in order to permit impregnation and encasement during the final casing forming operation. Generally the porosity of the bonded substrate can be measured in accordance with TAPPI test method T251-pm-75 and exhibits a Gurley porosity greater than 300 liters/minute. The porosity will vary with the weight of the base web and typically falls within the range of about 500 to 1,500 liters/minute. Lighter sheets will of course have a higher porosity while heavier weight materials exhibit lower porosities. For example, in accordance with the present invention the porosity of the bonded substrate may fall within the range of about 600–1,200 liters/minute.

The final casing is made in accordance with conventional casing forming techniques. However, in accordance with the present invention it has been found that the carbamate/alkaline curing resin composition may also be used in more concentrated form to provide the final casing. When this formulation is employed, the carbamate is mixed in an alkaline solution in substantially the same way as when the bonding solution is being prepared. However, the dilution steps are eliminated so that the concentration of the carbamate and alkaline curing resin are approximately 2 to 6 times greater than the concentration of those materials within the bonding solution. For example, the casing forming solution may have a carbamate concentration of approximately 6% by weight rather than the 1.5% preferred for the bonding solution. Typically, the ratio of carbamate to alkaline curing resin may be maintained at essentially the same level in the casing forming formulation as is found in the bonding solution. However, the total concentration of the surfactant remains substantially the same as in the bonding solution and is not correspondingly increased in the casing film forming formulation.

In contrast to a 10% pickup of binder by the base web material, the casing forming operation results in not only absorption of the casing forming solution within the substrate but the complete encasement of the substrate by the film forming material. Thus, the relative proportion of the casing film to the substrate on a weight basis is about 1:1 or greater and preferably about 2:1. Thus the resultant casing product is, in effect, a film of the casing forming material reinforced by a bonded fibrous substrate fully embedded therein.

Having generally described the invention, the following examples are included for purposes of illustration so that the invention may be more readily understood, and are in no way intended to limit the scope of the invention unless otherwise specifically indicated. All amounts are on a weight basis unless otherwise specified.

EXAMPLE 1

A commercially made preformed fibrous sheet having a ream weight of about 14.2 pounds (24gm/m$^2$) and composed of 100% hemp fibers was dip coated in a dilute aqueous alkaline solution having a pH of 12.0. The solution had a cellulose carbamate concentration of about 1.5% by weight, 0.5% by weight of a polymeric reaction product of epichlorohydrin and a polyamid (Kymene 557H) and 0.015% of the surfactant Triton X114. The treated substrate was dried and the carbamate regenerated by drying, followed by a 1% sulfuric acid wash to neutralize the sheet, followed by a water wash for about 10 minutes and subsequent drying. The resultant substrate is labelled A in Table 1.

A second series of substrates was prepared using the same base web material but bonding the base web with a dilute alkaline solution containing about 1.2 % viscose followed by drying, regeneration, washing and redrying. This substrate is labelled B.

Samples of the substrates A and B were made into casing using viscose alone, carbamate alone or a carbamate/Kymene 557 H/Triton X 114 solution wherein the carbamate and Kymene concentrations are 6% and 2% by weight, respectively. The resultant casings exhibited the machine direction wet tensile stress properties reported in Table 1.

As can be seen, substrate A bonded with the carbamate-resin bonding system of the present invention exhibited a significant improvement in tensile stress relative to the viscose bonded material regardless of the casing film used to form the final casing product. Additionally, it will be noted the stress measurement for the carbamate casing is substantially the same as that obtained for the viscose casing where the substrate is viscose bonded. Best results were obtained when the carbamate/Kymene combination of the present invention was employed as both the bonding agent and the casing forming film material.

A separate experiment was conducted where the commercially available fibrous web material was either bonded with carbamate alone (Substrate C) or left unbonded (Substrate D). When attempts where made to form casing using these substrates, it was found the substrates were too weak to support their own weight. Therefore it was necessary to support the substrates on glass plates during both the casing forming and regeneration operations until the casings were completely regenerated. When thus supported the substrates were formed into casing using as the casing film either viscose alone, carbamate alone or the carbamate/Kymene 557 solution of the present invention. As indicated in Table I, the wet tensile stress of Substrate C was significantly lower than the substrate A or B for carbamate or carbamate/Kymene casings. The table also shows little difference between substrate C and the unbonded substrate D for those casings.

Table I further reports the tensile stress of cast films of various materials. As indicated, the carbamate/Kymene 557 formulation of the present invention forms a significantly weaker film thereby rendering the results of substrate A particularly surprising.

The burst strengths of the viscose casings made from substrate A and B were measured in order to compare the properties of the resultant casings. This was accomplished by placing the open ended casing tube in an apparatus consisting of two air fed cup-shaped mandrels, one secured in place, the other mounted on a slide-way system. The casing tube was mounted so that the ends of the tube slipped over the open ends of the mandrels and were secured by means of strong adjustable clips making an air tight seal between the tube and the mandrel. Two lightweight probes, one on either side of the tube were moved in their slide-way systems so that they lightly touched the tube sides after the tube had been inflated by a test air pressure of two pounds per square inch. Air was then fed continuously into the tube via one of the mandrels so as to increase the pressure by two pounds per square inch per minute. Any increase in length of the tube was compensated for by the mobile mandrel. The pressure increase and increasing distance between the probes as the tube expanded under pressure were plotted on a chart recorder as an X-Y plot of pressure vs increasing diameter. The test ended when the tube failed under pressure.

Using this test procedure the tube burst strength was found to be 12.45 psi for the substrate B casing and 14.4 psi for the substrate A casing at substantially identical tube weights of 5.38 grams and 5.34 grams, respectively. Thus the casing using the substrate of the present invention exhibited a burst strength improvement of more than 15%.

TABLE I

| | | Wet Tensile Stress (g/mm$^2$) Casing Film | | |
|---|---|---|---|---|
| Substrate | Bonding Type | Viscose | Carbamate | Carbamate/Kymene |
| A | Carbamate/Kymene | 2717 | 2608 | 2880 |
| B | Viscose | 2540 | 2591 | 2793 |
| C | Carbamate | 2565 | 1974 | 2106 |
| D | Unbonded | 1910 | 1925 | 2292 |
| | Cast film (no substrate) | 1270 | 1069 | 855 |

EXAMPLE 2

A preformed fiber sheet having a ream weight of about 14.2 pounds and comprising 100% hemp fibers with about 0.1% Kymene 557 added to the beater prior to sheet formation were bonded in the laboratory using the carbamate/Kymene bonding solution and the carbamate bonding solution of Example 1. The wet tensile strength of the substrate treated in accordance with the present invention was 1,700 grams per 25 millimeters while the material bonded with only carbamate exhibited a wet tensile strength of 916 grams per 25 millimeters. The caustic tensile strength for these substrates was 917 grams and 159 grams, respectively.

EXAMPLE 3

The procedure of Example 2 was repeated except that the fibrous base web did not contain beater added Kymene. The wet tensile strength of the substrate treated in accordance with the present invention was 1,762 grams per 25 millimeters while the material bonded with only carbamate exhibited a wet tensile strength of only 54 grams per 25 millimeters. The caustic tensile strength for these substrates was 1,240 grams and 0, respectively.

EXAMPLE 4

The procedure of Example 3 was repeated except that the bonding operation was provided by dip treating the fibrous base web material on a pilot machine. In this instance the viscose bonded sheet showed a machine direction wet tensile strength of 1685 grams per 25 millimeters while the carbamate/Kymene treated substrate exhibited a machine direction wet tensile strength of 1943 grams per 25 millimeters.

EXAMPLE 5

A series of laboratory experiments was conducted in order to determine the effect of adding varying amounts of Kymene 557 to a bonding solution of either viscose or carbamate.

Figure 2:
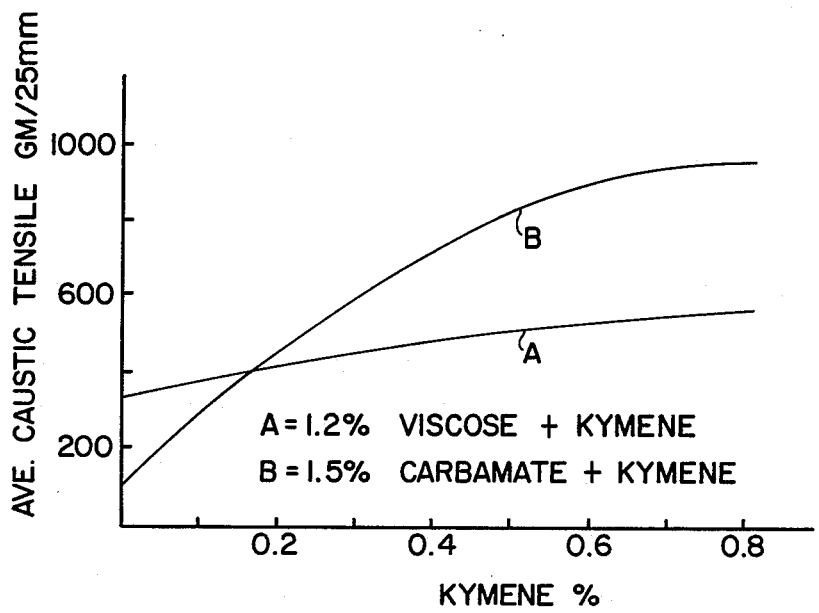

Paper samples from a hemp fiber paper having a basis weight of about 14.2 pounds were treated with bonding solution to provide a pick up when dry of 1.5% carbamate plus incremental amounts of Kymene 557. Similar samples were treated with a standard viscose binder containing about 1.2% viscose and similarly increasing amounts of Kymene 557. The resultant substrate materials were tested for average wet tensile strength and average caustic tensile strength. The results were plotted to provide the graphs of FIGS. 1 and 2 As clearly indicated therein, the bonding solution containing carbamate had a lower initial wet tensile and caustic tensile strengths but rapidly increased in strength as a result of the Kymene addition while the strength of the viscose bonding material showed very little change as a result of the Kymene addition.

As will be apparent to a person skilled in the art, various modifications and adaptations of the process and product described above will become readily apparent without departing from the spirit and scope of the invention.

We claim:

1. A bonded porous fibrous substrate suitable for use in the manufacture of casings for food products and the like comprising a fibrous base web containing about 10% by weight or less of a bonding agent comprised of cellulose carbamate and an alkaline curing resin, the ratio of carbamate to resin being greater than 1:1 by weight, said substrate having a porosity of at least 300 liters/min as determined by TAPPI test method T251-pm-75, a caustic tensile strength greater than 300 grams per 25 millimeters and being adapted to form reinforced casing films having excellent burst strength.

2. The bonded substrate of claim 1 wherein the alkaline curing resin is a polymeric reaction product of epichlorohydrin and a polyamide.

3. The bonded substrate of claim 1 including a minor amount of a surfactant.

4. The bonded substrate of claim 3 wherein the surfactant is a non-ionic alkylaryl polyether alcohol.

5. The bonded substrate of claim 3 wherein the surfactant comprises less than about 0.1% by weight.

6. The bonded substrate of claim 1 wherein said ratio of carbamate to resin falls within the range of 10:1 to 5:4 by weight.

7. The bonded substrate of claim 6 wherein said ratio is about 5:1 to 2:1.

8. The bonded substrate of claim 1 wherein the bonding agent constitutes about 0.5% -6.0% by weight of the substrate.

9. The bonded substrate of claim 1 wherein the alkaline curing resin is a polymeric reaction product of epichlorohydrin and a polyamide, the bonding agent constitutes about 2.0% -4.5% by weight of the substrate and the ratio of carbamate to resin falls within the range of 2:1 to 5:1 by weight.

10. The bonded substrate of claim 1 wherein the porosity falls within the range of 600–1,200 liters/min.

11. A fiber reinforced casing material for food products and the like comprising a cellulosic film encasing a bonded porous fibrous substrate, said substrate comprising a fibrous base web containing about 10% by weight or less of a bonding agent comprised of cellulose carbamate and an alkaline curing resin, the ratio of carbamate to resin being greater than 1:1 by weight, said substrate having a porosity of at least 300 liters/min as determined by TAPPI test method T251-pm-75, a caustic tensile strength greater than 300 grams per 25 millimeters and being adapted to form reinforced casing films having excellent burst strength.

12. The casing of claim 11 wherein the alkaline curing resin is a polymeric reaction product of epichlorohydrin and a polyamide and the ratio of carbamate to resin in the bonding agent falls within the range of 10:1 to 5:4 by weight.

13. The casing substrate of claim 11 including less than 0.1 % by weight of a surfactant in the substrate.

14. The casing of claim 11 wherein the bonding agent constitutes about 2.0% -4.5% by weight of the substrate and the ratio of carbamate to resin in the bonding agent falls within the range of 2:1 to 5:1 by weight.

15. The casing of claim 11 wherein the cellulosic casing forming film is comprised of cellulose carbamate and an alkaline curing resin in a ratio greater than 1:1 by weight.

16. The casing of claim 15 wherein the resin is a polymeric reaction product of epichlorohydrin and a polyamid and said ratio falls within the range of 2:1 to 5:1 by weight.

17. The casing of claim 11 wherein the cellulosic casing forming film is cellulose xanthate viscose.

18. A fiber reinforced casing material for food products and the like comprising a fibrous base web containing about 10% by weight or less of a cellulosic binder encased within a cellulosic film, said binder being comprised of cellulose carbamate and an alkaline curing resin in a ratio greater than 1:1 by weight.

19. A process for producing a bonded porous fibrous substrate suitable for use in the manufacture of casings for food products and the like comprising the steps of forming a bonding solution for a fibrous base web comprising a dilute aqueous alkaline solution of less than 3% by weight cellulose carbamate and an alkaline curing resin, the ratio of carbamate to resin being greater than 1:1 by weight, treating the fibrous base web with the bonding solution to provide a binder pick up of about 10% by weight or less on a dry weight basis and a bonded substrate having a porosity of at least 300 liters/min as determined by TAPPI test method T251-pm-75 and a caustic tensile strength greater than 300 grams per 25 millimeters.

20. The process of claim 19 wherein the alkaline curing resin is a polymeric reaction product of epichlorohydrin and a polyamide and the ratio of carbamate to resin falls within the range of 10:1 to 5:4 by weight.

21. The process of claim 19 including the steps of embedding the bonded substrate in a cellulosic casing film whereby the substrate embedded within the film constitutes less than half the total weight of the reinforced casing.

22. The process of claim 21 wherein the cellulosic casing film comprises cellulose carbamate and an alkaline curing resin in a ratio of greater than 1:1 by weight.

* * * * *